Figure 1:
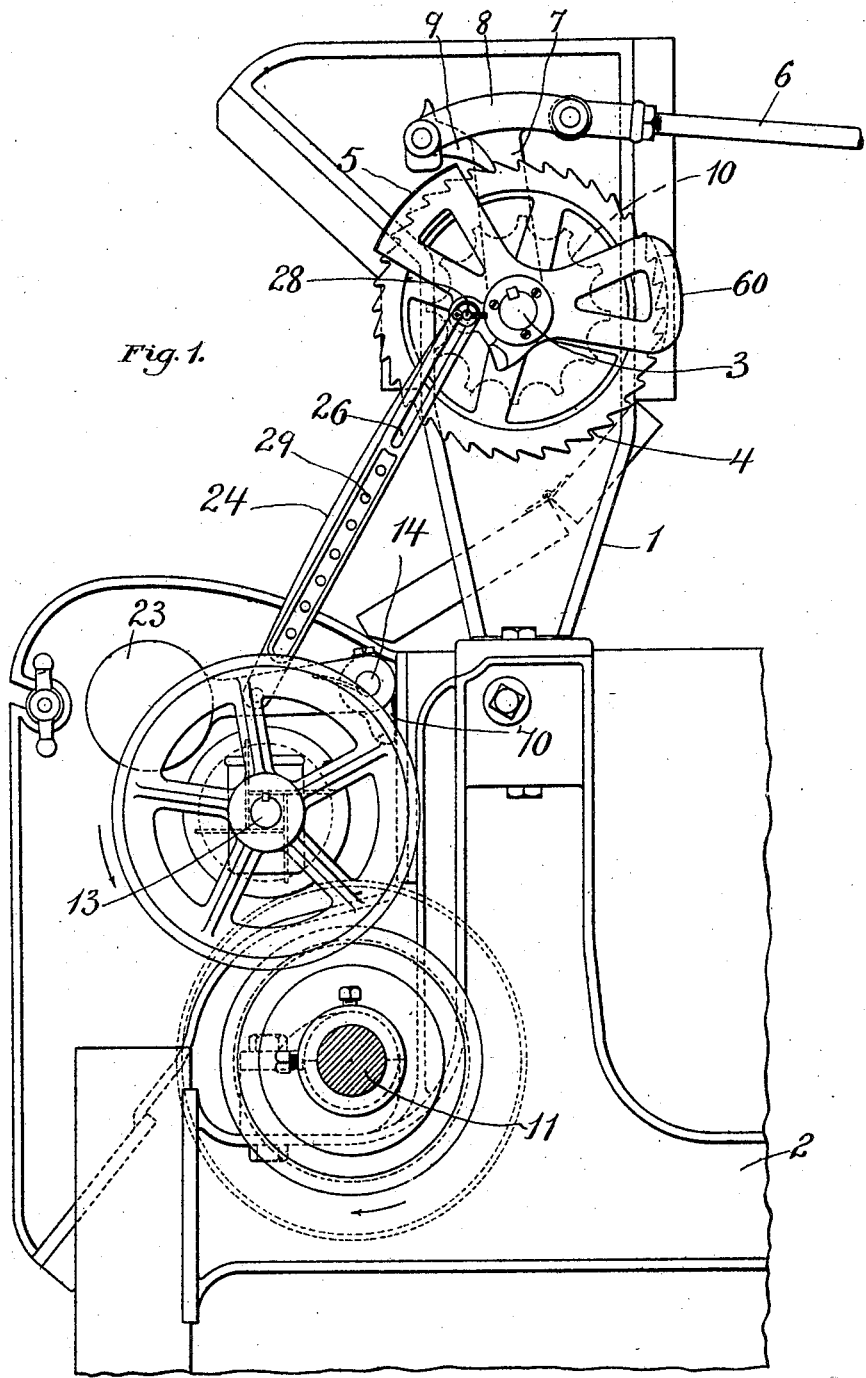

No. 878,188.

PATENTED FEB. 4, 1908.

C. B. P. CARVER.
FEED ATTACHMENT FOR COTTON GINS.
APPLICATION FILED FEB. 26, 1906.

3 SHEETS—SHEET 1.

Witnesses:
H. L. Robbins
E. Batchelder

Inventor:
Calvin B. P. Carver
by Wright Brown Quinby & May
Atty's

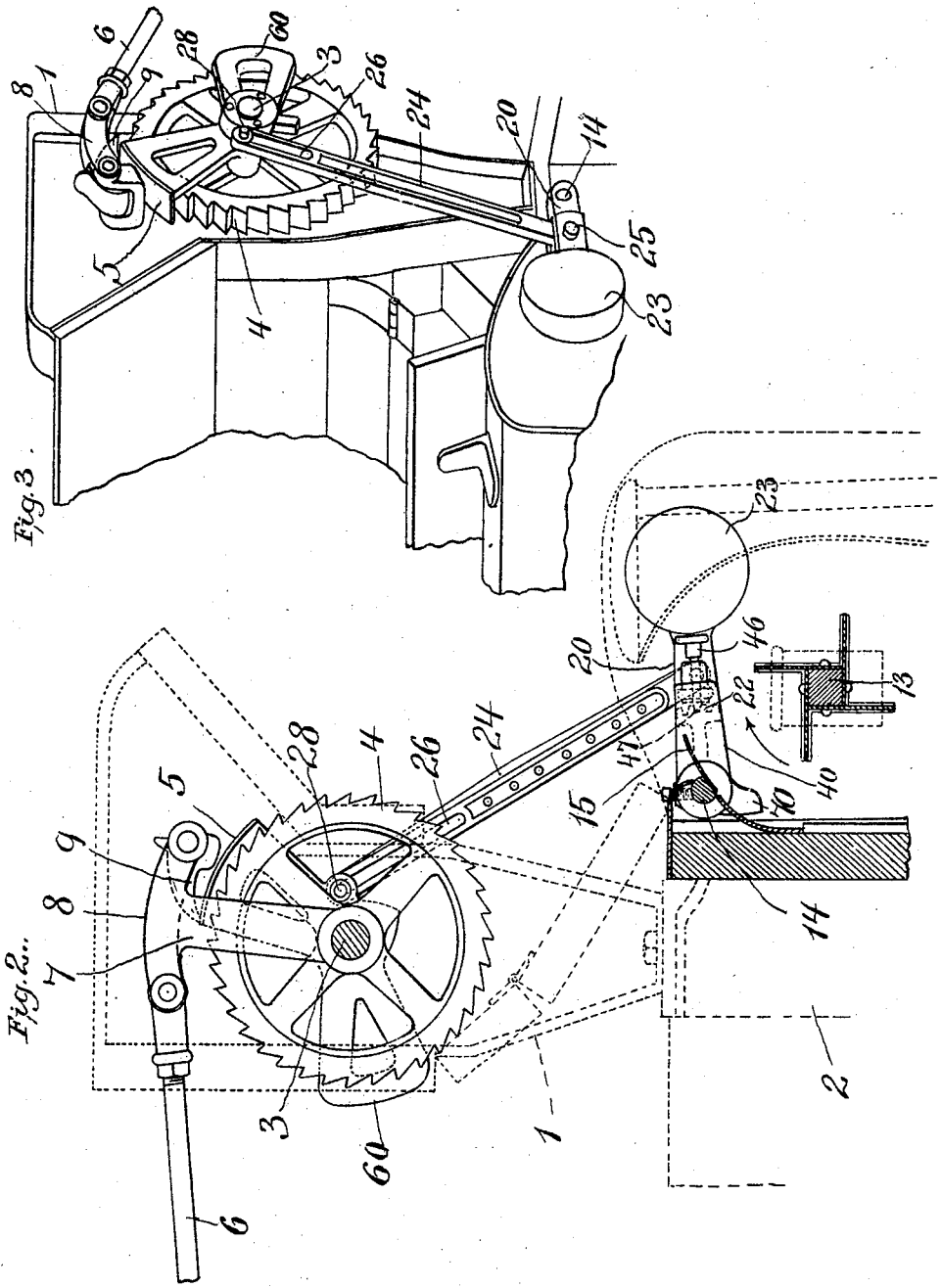

No. 878,188. PATENTED FEB. 4, 1908.
C. B. P. CARVER.
FEED ATTACHMENT FOR COTTON GINS.
APPLICATION FILED FEB. 26, 1906.
3 SHEETS—SHEET 3.
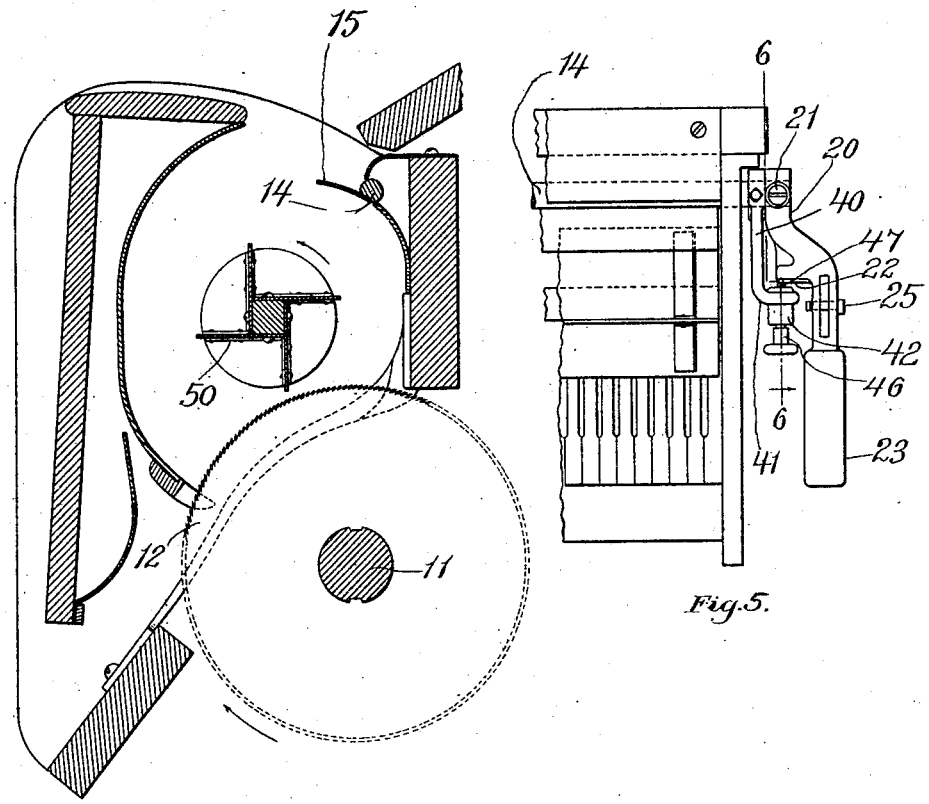
Fig.4.
Fig.5.
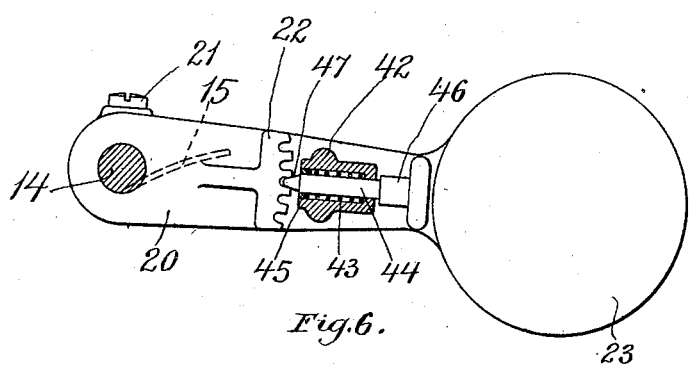
Fig.6.
Witnesses:
H. L. Robbins
E. Batchelder
Inventor:
Calvin B. P. Carver
By Wright Brown Quinby & May
Atty's.

UNITED STATES PATENT OFFICE.

CALVIN B. P. CARVER, OF BRIDGEWATER, MASSACHUSETTS, ASSIGNOR TO CARVER COTTON GIN COMPANY, OF EAST BRIDGEWATER, MASSACHUSETTS, A CORPORATION OF MASSACHUSETTS.

FEED ATTACHMENT FOR COTTON-GINS.

No. 878,188.　　　　Specification of Letters Patent.　　　　Patented Feb. 4, 1908.

Application filed February 26, 1906. Serial No. 302,860.

*To all whom it may concern:*

Be it known that I, CALVIN B. P. CARVER, of Bridgewater, in the county of Plymouth and State of Massachusetts, have invented certain new and useful Improvements in Feed Attachments for Cotton-Gins, of which the following is a specification.

This invention relates to a new and improved feed attachment, and while designed particularly for use in connection with cotton-gins, it is designed for use in any relation where the ready adjustment of the power of the feed regulator is desired.

Figure 1, in end elevation, shows a portion of a cotton-gin equipped with this improved attachment showing the weight, and the pitman between the weight and the pivoted shield that controls the action of the feed-pawl. Fig. 2 is a like view, taken from the opposite end of the machine, and showing the rack-segment carried by the weight-arm, also a float-board and saw-feed-drum. Fig. 3 is a perspective view of the parts shown in Fig. 2. Fig. 4 is a vertical longitudinal sectional view taken lengthwise and central of the machine, showing a conventional arrangement of saws, saw-feed-drum and float-board. Fig. 5 is a front elevation of the parts illustrated in Fig. 1, showing the arrangement of the spring detent with segment on the weight-arm. Fig. 6 is a cross-sectional view, taken on the line 6—6, of Fig. 5, looking in the direction of the arrow, and shows the arrangement of the detent with the segment.

1 represents the hopper, 2 the frame-work of a gin, so much only of its parts being shown as is necessary to illustrate the connection of my invention therewith.

3 represents the hopper-feed-shaft, 4 the ratchet-wheel fast on said shaft.

6 represents a reciprocating feed-rod, 7 represents a lever, the lower end of which is pivoted on the shaft 3, while the upper end is formed with a segmental member 8, to the rear end of which the reciprocating feed-rod is attached, a pawl 9 being pivoted to the front end of the segment 8 in position to engage the teeth of the ratchet 4, thereby turning the ratchet-wheel intermittently in the same direction and giving to the fluted feed-roll 10 a corresponding motion.

11 represents a gin-cylinder, mounted in the frame-work, and carrying a series of saws 12.

13 represents a shaft mounted in the frame-work above the cylinder 11, provided with a series of feed-blades 50, adapted to rotate in the direction of the arrow (Figs. 1 and 4.)

14 represents a shaft mounted in the upper part of the frame-work 2, in front of the lower end of the hopper 1.

15 represents a float-board secured to the shaft 14 and adapted to be moved upward by the cotton, or other material operated upon, when the supply becomes excessive, thereby turning the shaft 14 in the usual way. All these parts are, or may be, of common and well-known construction. Upon the outer end of the shaft 14 is loosely mounted an arm 20, maintained in place by a set-screw 21, taking into a peripheral groove, not shown, in shaft 14, in order to prevent the arm from slipping off the shaft. A collar, or other suitable device, may be employed for this purpose, if desired.

22 represents a segment carried by the arm 20.

23 represents a weight, here shown carried by and integral with the front end of the arm 20.

24 represents a link, or pitman, the lower end of which is pivoted by a pin 25 to the arm 20, between the weight 23 and the segment 22. The upper end of this arm is formed with a slot 26, in which is arranged a pin 28, connected to the pivoted shield 5, the counterbalance 60 keeping the pin 28 at the upper end of the slot 26. The pitman 24, below the slot 26, is formed with a series of apertures 29 to receive the pin 25. By this arrangement, any desired adjustment can be given the shield with relation to the float-board in the inoperative position of the latter (see Fig. 4).

The parts are so arranged that while the float-board 14 remains in the position shown in Fig. 4, pawl 9 will engage the teeth of the ratchet-wheel 4 upon the reciprocation of the rod 6, and thus give the desired intermittent motion to the fluted feed-wheel 10. If, for any reason, the supply of cotton-seed in the chamber around and in blades 50 becomes excessive, such excessive supply will tilt the float-board 13, turning the shaft 14 and raising the weight 23 and the arm 20 and turning the shield 5 under the pawl 9, thus preventing the latter from engaging the teeth of the ratchet 4 and maintaining the fluted wheel 10 against motion until the supply of cotton, or other material, in the chamber around the blades 50 has become exhausted sufficiently to permit the float-board to return to its normal position (Fig. 2). It is very desirable, in this class of machines, to adjust the weight 23 up and down, in order to provide for a greater or less resistance of the float-board 14 to the action of the cotton seed. Heretofore, such adjustment has been effected with a great deal of difficulty, and by mechanism more or less clumsy. My invention overcomes this difficulty, and provides means whereby this weight can be readily adjusted without stopping the machine.

40 represents an arm rigidly secured upon the shaft 14, inside of and adjacent to the arm 20 (Fig. 5). The front end of this arm 40 is bent on itself, as at 41, and formed with a hub 42, adapted to receive a spring 43, and a spindle 44.

45 represents a collar secured to the lower end of the spindle and positioned in the recess of the hub, the spring 43 being arranged around the spindle between the collar 45 and the end of said recess (Fig. 6). To the outer end of the spindle is secured a handle 46, while the inner end of the spindle is formed as a dog 47 to engage the teeth of the segment 22, the spring 43 normally tending to maintain the dog 47 between two teeth of the segment 22. If, for any reason, it is desired to shift the weight 23 up or down, thereby changing the leverage of the arm 20 and the effect of the weight on the float-board 15, this can be readily done by the operator grasping the weight 23 and the handle 46, pulling out the dog 47 and raising or lowering the weight 23 and its arm 20 to the desired point, when by releasing the handle 46, the dog 47 will thereafter maintain the weight in its adjusted position. A lug 70 upon the pivoted end of the arm 40, by engaging the frame-work, limits the downward movement of the arm and float-board.

What I claim is:

1. In a cotton-gin, or linter, a weight-supporting arm pivoted upon the float-board-shaft, and provided with a segment, a second arm rigidly secured upon said shaft, formed with a detent to engage said segment.

2. In a cotton-gin, or linter, a weight-supporting arm pivoted upon the float-board-shaft, a second arm, or member, rigidly secured to said shaft and complemental engaging parts upon said arms.

In testimony whereof I have affixed my signature, in presence of two witnesses.

CALVIN B. P. CARVER.

Witnesses:
 WILLIAM QUINBY,
 E. A. ALLEN.